(12) United States Patent
Shimizu

(10) Patent No.: US 6,494,581 B2
(45) Date of Patent: Dec. 17, 2002

(54) LAMP HOUSE AND PROJECTOR DEVICE THEREOF

(75) Inventor: Mikiya Shimizu, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 0 days.

(21) Appl. No.: 09/800,500

(22) Filed: Mar. 8, 2001

(65) Prior Publication Data
US 2001/0021006 A1 Sep. 13, 2001

(30) Foreign Application Priority Data

Mar. 10, 2000 (JP) .......................... 2000-066184

(51) Int. Cl.[7] .................. G03B 21/16; G03B 21/18
(52) U.S. Cl. ..................... 353/61; 353/52; 353/57
(58) Field of Search ..................... 353/52, 57, 61; 355/30; 362/226, 294, 373

(56) References Cited

U.S. PATENT DOCUMENTS

| | | | |
|---|---|---|---|
| 2,120,005 A | * 6/1938 | Scott | 352/202 |
| 4,925,295 A | * 5/1990 | Ogawa et al. | 353/57 |
| 5,162,020 A | * 11/1992 | Asano et al. | 165/103 |
| 5,300,976 A | * 4/1994 | Lim et al. | 348/333.1 |
| 5,881,558 A | * 3/1999 | Kawahara et al. | 454/156 |
| 6,161,946 A | * 12/2000 | Bishop et al. | 362/294 |
| 6,283,614 B1 | * 9/2001 | Okada et al. | 362/227 |

* cited by examiner

Primary Examiner—Russell Adams
Assistant Examiner—D. Ben Esplin
(74) Attorney, Agent, or Firm—Foley & Lardner

(57) ABSTRACT

A lamp house prevents danger when a lamp bulb, acting as a light source in a housing, breaks. The lamp house includes, at inlet and outlet vents for cooling the lamp bulb, movable plates which are movable only toward the inside of the housing of the lamp house. Springs for closing the movable plates are provided and a sensor for detecting opening and closing states of one of the movable plates is disposed on the side of the inlet vent.

26 Claims, 9 Drawing Sheets

LAMP HOUSE AND PROJECTOR DEVICE THEREOF

BACKGROUND OF THE INVENTION

1. Field of the Invention

The present invention relates to a lamp house, and more particularly, to a lamp house which makes a lamp having high-pressure gas filled therein emit light and a projector device thereof.

2. Description of the Related Art

A lamp house is a housing in which a discharge lamp is attached for making a lamp with high-pressure gas such as mercury and xenon filled therein emit light. Light emission from a discharge lamp provided in a lamp house is for use as a light source for experiments. The lamp may be used for: (a) an instrument for analysis; (b) printing a semiconductor; (c) a fluorescence microscope; (d) a blood analyzer; (e) curing ultraviolet rays; and (f) projecting a picture and as an interferometer, a refractometer, or as a microfilm enlargement device. In addition, for use as a light source for these purposes, the lamp house is often attached to a projector device which conducts floodlighting, projecting and profile projecting for relevant purposes.

As a discharge lamp, when used as a light source, generates great heat (e.g. higher than 700 degrees centigrade of a surface temperature) and has a high-pressure gas filled therein (e.g. about 10 atmospheres at room temperature and 40 atmospheres at operation), if the lamp breaks for some reason, it may be very dangerous.

A lamp house therefore has two functions: (a) housing a discharge lamp used as a light source to emit light while reducing the likelihood of harm caused by a possible lamp breakage; and (b) preventing overheating of the discharge lamp by cooling the lamp with outside air. Moreover, being provided in a lamp house, a discharge lamp is protected from breakage due to mechanical shock and being cooled; the lamp will have its deterioration suppressed to maintain brightness and life.

FIG. 10 is a perspective view showing a structure of conventional lamp house 1d and projector device 2d.

With reference to FIG. 10, the lamp house 1d has in its housing a lamp bulb 40 serving as a light source and an attached reflector 33 provided around the lamp bulb for reflecting and converging light, thereby converging light toward a window 70 to emit light to the outside of the lamp house 1d. For the window 70, dissolved quartz (fused quartz) or the like having a high ultraviolet ray transmissibility is used.

Also provided, for ventilation and for cooling the lamp bulb 40, are two openings, an air inlet 10 and an air outlet 20.

The lamp house 1d directs outside air sent from a sirocco fan 18 of the projector device 2d from the air inlet 10 to the lamp bulb 40 to cool the same and externally exhausts the air heated inside the lamp house 1d through the air outlet 20.

The air inlet 10 and the air outlet 20 of the lamp house 1d are covered with metal meshes 19 and 29 (wire netting) to prevent broken pieces of the lamp (generated when the lamp bulb 40 breaks) from exiting the housing. The metal meshes 19 and 29 prevent relatively large fragments from scattering outside the device.

Also provided is a static pressure meter 50 which detects a difference between external and internal pressures of the lamp house 1d in order to check whether the lamp bulb 40 is currently being cooled by ventilation from the sirocco fan 18.

The higher the temperature becomes, the higher the possibility becomes for the lamp bulb 40 to break (i.e., high temperatures enhance a deterioration rate and shorten bulb life). Therefore, it is necessary to check whether the bulb is being cooled to avoid this danger.

When the lamp bulb 40 is being cooled, a large difference is generated between internal and external pressures of the lamp house 1d because air is sent into the lamp house 1d at high pressure to cool the lamp bulb 40. Accordingly, measuring the pressure difference by the static pressure meter 50 leads to determination as to whether the lamp bulb is being cooled.

The static pressure meter 50 for checking the cooling is connected to a control circuit or the like of the projector device 2d. The control circuit executes processing to start ventilation, to stop light emission (to stop power transmission to the lamp bulb 40), and to notify a user when there is no ventilation, thereby preventing overheating of the lamp bulb 40.

Inside the air inlet 10, attached is a guide metallic part 60 for directing cooling air from the sirocco fan 18 to appropriate parts of the lamp bulb 40.

The lamp bulb 40 has its cap parts 41 and 42 cooled (e.g. 200 degrees centigrade or less) for maintaining brightness and life while its central part emitting a light is maintained at a high temperature (e.g. 750 degrees centigrade or less). Accordingly, in the lamp house 1d, the guide metallic part 60 provided therein targets a part at which ventilation from the air inlet 10 hits at the cap parts 41 and 42 to intensively cool the cap parts.

In a conventional lamp house, an opening for cooling a lamp bulb is thus open all the time. Even if the openings are covered with the metal meshes 19 and 29, small broken pieces might scatter to the outside of the lamp house. In addition, a static pressure meter for checking whether a lamp bulb is being cooled is expensive.

As described in the foregoing, conventional lamp houses have the following problems.

First, because an opening is open all the time, when a lamp bulb breaks up, there is danger of scattering of broken pieces to the outside of the lamp house through a space between metal meshes covering the opening and the like.

Secondly, an expensive static pressure meter is necessary to detect whether ventilation is conducted to cool a lamp bulb.

Thirdly, a guide metallic part should be specially provided for appropriately directing ventilation.

SUMMARY OF THE INVENTION

First object of the present invention is to provide a lamp house which appropriately prevents danger in a case of break-up of a lamp bulb and efficiently cools the lamp bulb, and a projector device thereof.

Second object of the present invention is to provide a lamp house realizing a function of detecting whether cooling is conducted or not by a simple structure manufacturable at low costs without requiring an advanced function such as a static pressure meter and a projector device thereof.

Third object of the present invention is to provide a lamp house enabling a unit for adjusting a direction of ventilation for cooling a lamp bulb to be effectively structured and a projector device thereof.

According to one aspect of the invention, a lamp house comprises, at a vent hole for cooling a light source provided in a housing by ventilation, a movable plate which is movable only toward the inside of the housing.

In the preferred construction, the movable plate is attached to the inner side of the side surface of the housing by means of a hinge provided at the upper part of the movable plate, and when the lamp house is not attached to a projector device, the movable plate closes because of its own weight.

In another preferred construction, when the lamp house is attached to a projector device, the movable plate disposed on the side of an air inlet of the vent hole opens inwardly upon receiving ventilation from the projector device, and the movable plate disposed on the side of an air outlet of the vent hole opens upon insertion of a duct of the projector device into the housing through the air outlet.

In another preferred construction, the movable plate is attached to the inner side of the side surface of the housing by means of a hinge provided at the upper part of the movable plate, when the lamp house is not attached to a projector device, the movable plate closes because of its own weight, and when the lamp house is attached to the projector device, the movable plate disposed on the side of an air inlet of the vent hole opens inwardly upon receiving ventilation from the projector device, and the movable plate disposed on the side of an air outlet of the vent hole opens upon insertion of a duct of the projector device into the housing through the air outlet.

In another preferred construction, when the lamp house is attached to a projector device, the movable plate disposed on the side of an air inlet of the vent hole opens inwardly upon receiving ventilation from the projector device, and the movable plate disposed on the side of an air outlet of the vent hole opens upon insertion of a duct of the projector device into the housing through the air outlet, and which further comprises a spring for closing the movable plate, wherein when the lamp house is not attached to the projector device, the spring closes the movable plate irrespective of the position of the housing, and the spring attached to the movable plate on the side of the air inlet of the vent hole opens the movable plate inwardly upon receiving ventilation from the projector device.

In another preferred construction, the movable plate is attached to the inner side of the side surface of the housing by means of a hinge provided at the upper part of the movable plate, when the lamp house is not attached to a projector device, the movable plate closes because of its own weight, and when the lamp house is attached to the projector device, the movable plate disposed on the side of an air inlet of the vent hole opens inwardly upon receiving ventilation from the projector device, and the movable plate disposed on the side of an air outlet of the vent hole opens upon insertion of a duct of the projector device into the housing through the air outlet, and which further comprises a spring for closing the movable plate, wherein when the lamp house is not attached to the projector device, the spring closes the movable plate irrespective of the position of the housing, and the spring attached to the movable plate on the side of the air inlet of the vent hole opens the movable plate inwardly upon receiving ventilation from the projector device.

In another preferred construction, when the lamp house is attached to a projector device, the movable plate disposed on the side of an air inlet of the vent hole opens inwardly upon receiving ventilation from the projector device, and the movable plate disposed on the side of an air outlet of the vent hole opens upon insertion of a duct of the projector device into the housing through the air outlet, and which further comprises a sensor for detecting opening and closing states of the movable plate disposed on the side of the air inlet of the vent hole.

In another preferred construction, the movable plate is attached to the inner side of the side surface of the housing by means of a hinge provided at the upper part of the movable plate, when the lamp house is not attached to a projector device, the movable plate closes because of its own weight, and when the lamp house is attached to the projector device, the movable plate disposed on the side of an air inlet of the vent hole opens inwardly upon receiving ventilation from the projector device, and the movable plate disposed on the side of an air outlet of the vent hole opens upon insertion of a duct of the projector device into the housing through the air outlet, and which further comprises a sensor for detecting opening and closing states of the movable plate disposed on the side of the air inlet of the vent hole.

In another preferred construction, when the lamp house is attached to a projector device, the movable plate disposed on the side of an air inlet of the vent hole opens inwardly upon receiving ventilation from the projector device, and the movable plate disposed on the side of an air outlet of the vent hole opens upon insertion of a duct of the projector device into the housing through the air outlet, and which further comprises a spring for closing the movable plate, wherein when the lamp house is not attached to the projector device, the spring closes the movable plate irrespective of the position of the housing, and the spring attached to the movable plate on the side of the air inlet of the vent hole opens the movable plate inwardly upon receiving ventilation from the projector device, and a sensor for detecting opening and closing states of the movable plate disposed on the side of the air inlet of the vent hole.

In another preferred construction, the movable plate is attached to the inner side of the side surface of the housing by means of a hinge provided at the upper part of the movable plate, when the lamp house is not attached to a projector device, the movable plate closes because of its own weight, and when the lamp house is attached to the projector device, the movable plate disposed on the side of an air inlet of the vent hole opens inwardly upon receiving ventilation from the projector device, and the movable plate disposed on the side of an air outlet of the vent hole opens upon insertion of a duct of the projector device into the housing through the air outlet, and which further comprises a spring for closing the movable plate, wherein when the lamp house is not attached to the projector device, the spring closes the movable plate irrespective of the position of the housing, and the spring attached to the movable plate on the side of the air inlet of the vent hole opens the movable plate inwardly upon receiving ventilation from the projector device, and a sensor for detecting opening and closing states of the movable plate disposed on the side of the air inlet of the vent hole.

In another preferred construction, using the movable plate disposed on the side of an air inlet of the vent hole, an air path, in the lamp house, of ventilation received from the projector device is set.

In another preferred construction, the movable plate is attached to the inner side of the side surface of the housing by means of a hinge provided at the upper part of the movable plate, when the lamp house is not attached to a projector device, the movable plate closes because of its own weight, and using the movable plate disposed on the side of an air inlet of the vent hole, an air path, in the lamp house, of ventilation received from the projector device is set.

In another preferred construction, when the lamp house is attached to a projector device, the movable plate disposed on the side of an air inlet of the vent hole opens inwardly upon receiving ventilation from the projector device, and the movable plate disposed on the side of an air outlet of the vent hole opens upon insertion of a duct of the projector device into the housing through the air outlet, and which further comprises a spring for closing the movable plate, wherein when the lamp house is not attached to the projector device, the spring closes the movable plate irrespective of the position of the housing, and the spring attached to the movable plate on the side of the air inlet of the vent hole opens the movable plate inwardly upon receiving ventilation from the projector device, and using the movable plate disposed on the side of the air inlet of the vent hole, an air path, in the lamp house, of ventilation received from the projector device is set.

In another preferred construction, the vent hole includes a plurality of air inlets.

According to another aspect of the invention, a projector device to which a lamp house is attached, the lamp house comprises, at a vent hole for cooling a light source provided in a housing by ventilation, a movable plate which is movable only toward the inside of the housing.

In the preferred construction, the projector device comprises a duct for externally discharging exhaust air from the lamp house, wherein at the time of attachment of the lamp house to the projector device, the duct is inserted into the housing through the air outlet to open the movable plate provided at the air outlet toward the inside of the housing.

In another preferred construction, the projector device comprises a duct for externally discharging exhaust air from the lamp house, wherein at the time of attachment of the lamp house to the projector device, the duct is inserted into the housing through the air outlet to open the movable plate provided at the air outlet toward the inside of the housing, and the duct has an exhaust air outlet for discharging exhaust air from the lamp house whose area is larger than a sectional area of each part of the duct and has the exhaust air outlet covered with wire netting.

In another preferred construction, the projector device further comprises ventilation means for ventilating the lamp house, wherein the ventilation means opens the movable plate disposed on the side of an air inlet of the vent hole toward the inside of the housing by a wind pressure caused at the time of ventilation.

In another preferred construction, the projector device comprises a duct for externally discharging exhaust air from the lamp house, wherein at the time of attachment of the lamp house to the projector device, the duct is inserted into the housing through the air outlet to open the movable plate provided at the air outlet toward the inside of the housing, and ventilation means for ventilating the lamp house, wherein the ventilation means opens the movable plate disposed on the side of an air inlet of the vent hole toward the inside of the housing by a wind pressure caused at the time of ventilation.

In another preferred construction, the projector device comprises a duct for externally discharging exhaust air from the lamp house, wherein at the time of attachment of the lamp house to the projector device, the duct is inserted into the housing through the air outlet to open the movable plate provided at the air outlet toward the inside of the housing, and the duct has an exhaust air outlet for discharging exhaust air from the lamp house whose area is larger than a sectional area of each part of the duct and has the exhaust air outlet covered with wire netting, and ventilation means for ventilating the lamp house, wherein the ventilation means opens the movable plate disposed on the side of an air inlet of the vent hole toward the inside of the housing by a wind pressure caused at the time of ventilation.

In another preferred construction, the projector device further comprises ventilation means for ventilating the lamp house, wherein the ventilation means opens the movable plate disposed on the side of an air inlet of the vent hole toward the inside of the housing by a wind pressure caused at the time of ventilation, and control means for controlling operation of the lamp house, wherein the control means determines whether the light source is being cooled according to opening and closing states of the movable plate disposed on the side of the air inlet of the vent hole.

In another preferred construction, the projector device comprises a duct for externally discharging exhaust air from the lamp house, wherein at the time of attachment of the lamp house to the projector device, the duct is inserted into the housing through the air outlet to open the movable plate provided at the air outlet toward the inside of the housing, ventilation means for ventilating the lamp house, wherein the ventilation means opens the movable plate disposed on the side of an air inlet of the vent hole toward the inside of the housing by a wind pressure caused at the time of ventilation, and control means for controlling operation of the lamp house, wherein the control means determines whether the light source is being cooled according to opening and closing states of the movable plate disposed on the side of the air inlet of the vent hole.

In another preferred construction, the projector device comprises a duct for externally discharging exhaust air from the lamp house, wherein at the time of attachment of the lamp house to the projector device, the duct is inserted into the housing through the air outlet to open the movable plate provided at the air outlet toward the inside of the housing, and the duct has an exhaust air outlet for discharging exhaust air from the lamp house whose area is larger than a sectional area of each part of the duct and has the exhaust air outlet covered with wire netting, ventilation means for ventilating the lamp house, wherein the ventilation means opens the movable plate disposed on the side of an air inlet of the vent hole toward the inside of the housing by a wind pressure caused at the time of ventilation, and control means for controlling operation of the lamp house, wherein the control means determines whether the light source is being cooled according to opening and closing states of the movable plate disposed on the side of the air inlet of the vent hole.

In another preferred construction, the projector device further comprises ventilation means for ventilating the lamp house, wherein the ventilation means opens the movable plate disposed on the side of an air inlet of the vent hole toward the inside of the housing by a wind pressure caused at the time of ventilation, control means for controlling operation of the lamp house, wherein the control means determines whether the light source is being cooled according to opening and closing states of the movable plate disposed on the side of the air inlet of the vent hole, and a sensor for detecting opening and closing states of the movable plate disposed on the side of the air inlet of the vent hole.

In another preferred construction, the projector device comprises a duct for externally discharging exhaust air from the lamp house, wherein at the time of attachment of the lamp house to the projector device, the duct is inserted into the housing through the air outlet to open the movable plate provided at the air outlet toward the inside of the housing, ventilation means for ventilating the lamp house, wherein the ventilation means opens the movable plate disposed on the side of an air inlet of the vent hole toward the inside of the housing by a wind pressure caused at the time of ventilation, control means for controlling operation of the lamp house, wherein the control means determines whether the light source is being cooled according to opening and closing states of the movable plate disposed on the side of the air inlet of the vent hole, and a sensor for detecting opening and closing states of the movable plate disposed on the side of the air inlet of the vent hole.

In another preferred construction, the projector device comprises a duct for externally discharging exhaust air from the lamp house, wherein at the time of attachment of the lamp house to the projector device, the duct is inserted into the housing through the air outlet to open the movable plate provided at the air outlet toward the inside of the housing, and the duct has an exhaust air outlet for discharging exhaust air from the lamp house whose area is larger than a sectional area of each part of the duct and has the exhaust air outlet covered with wire netting, ventilation means for ventilating the lamp house, wherein the ventilation means opens the movable plate disposed on the side of an air inlet of the vent hole toward the inside of the housing by a wind pressure caused at the time of ventilation, control means for controlling operation of the lamp house, wherein the control means determines whether the light source is being cooled according to opening and closing states of the movable plate disposed on the side of the air inlet of the vent hole, and a sensor for detecting opening and closing states of the movable plate disposed on the side of the air inlet of the vent hole.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENTS

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instances, well-known structures are not shown in detail to prevent an unnecessary obscuring of the present invention.

Figure 1:
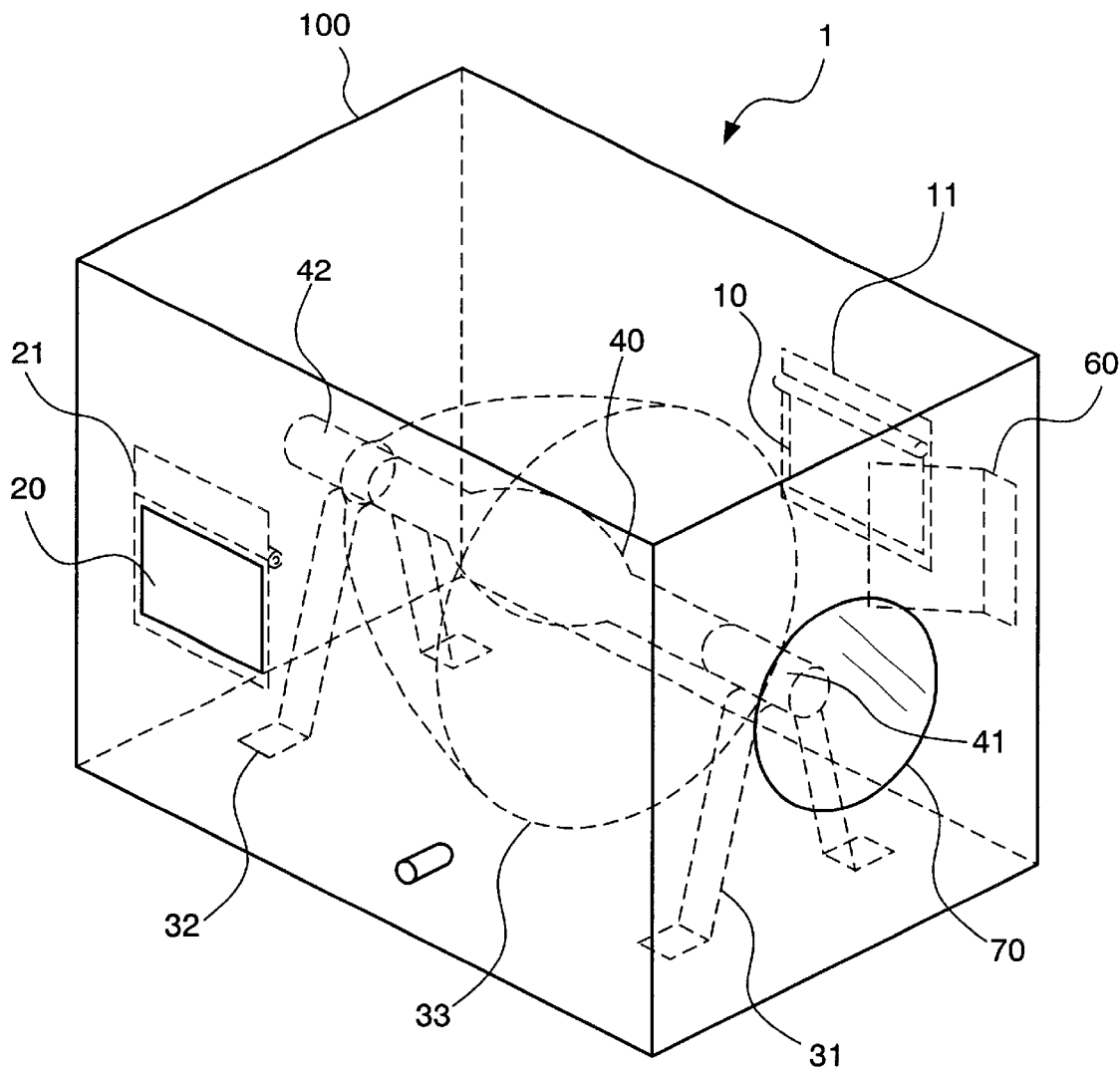
FIG. 1 is a perspective view showing a structure of a lamp house according to a first embodiment of the present invention.
Figure 2:
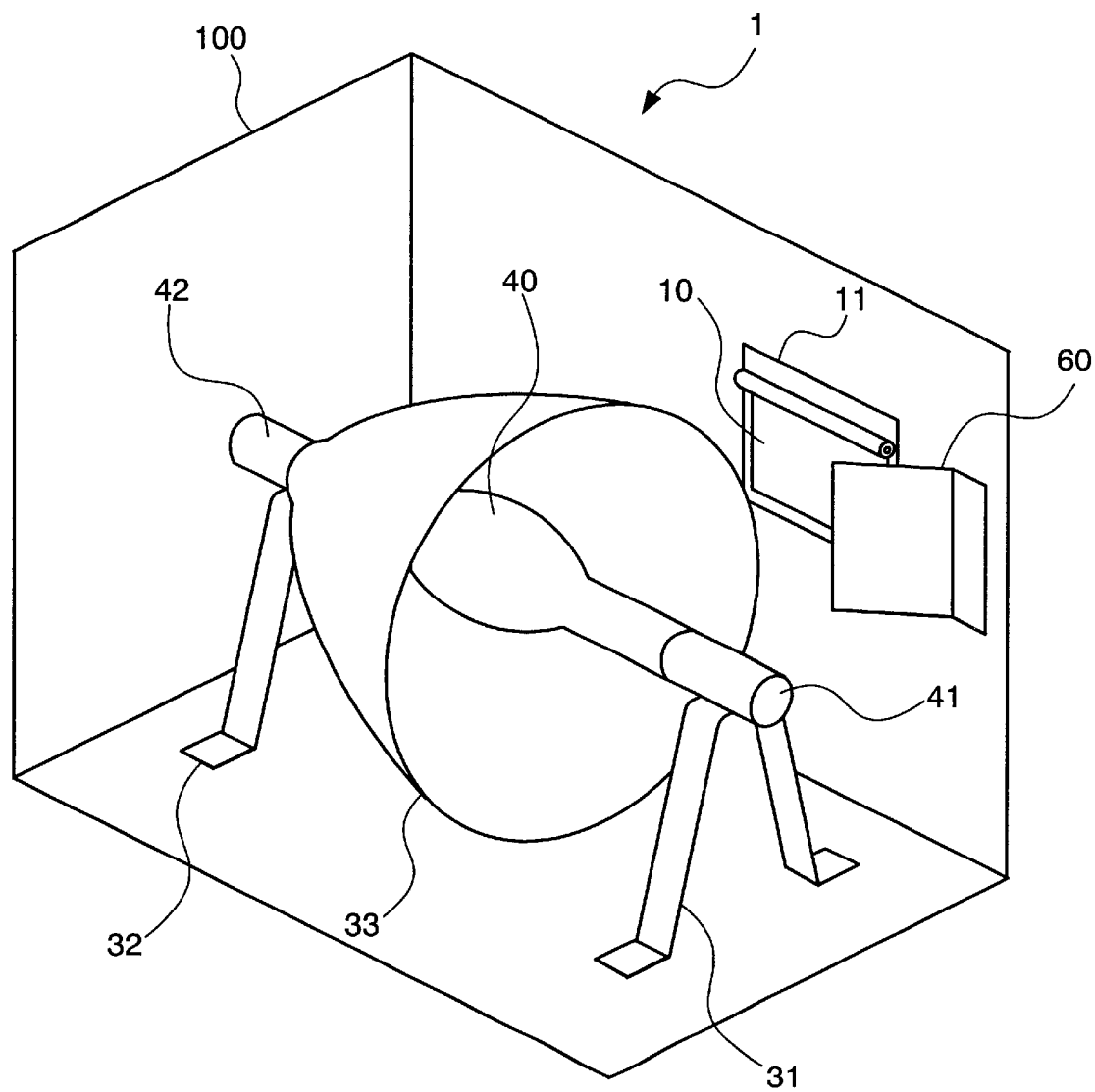
FIG. 2 is a perspective view showing the structure of the lamp house according to the first embodiment of the present invention.
Figure 3:
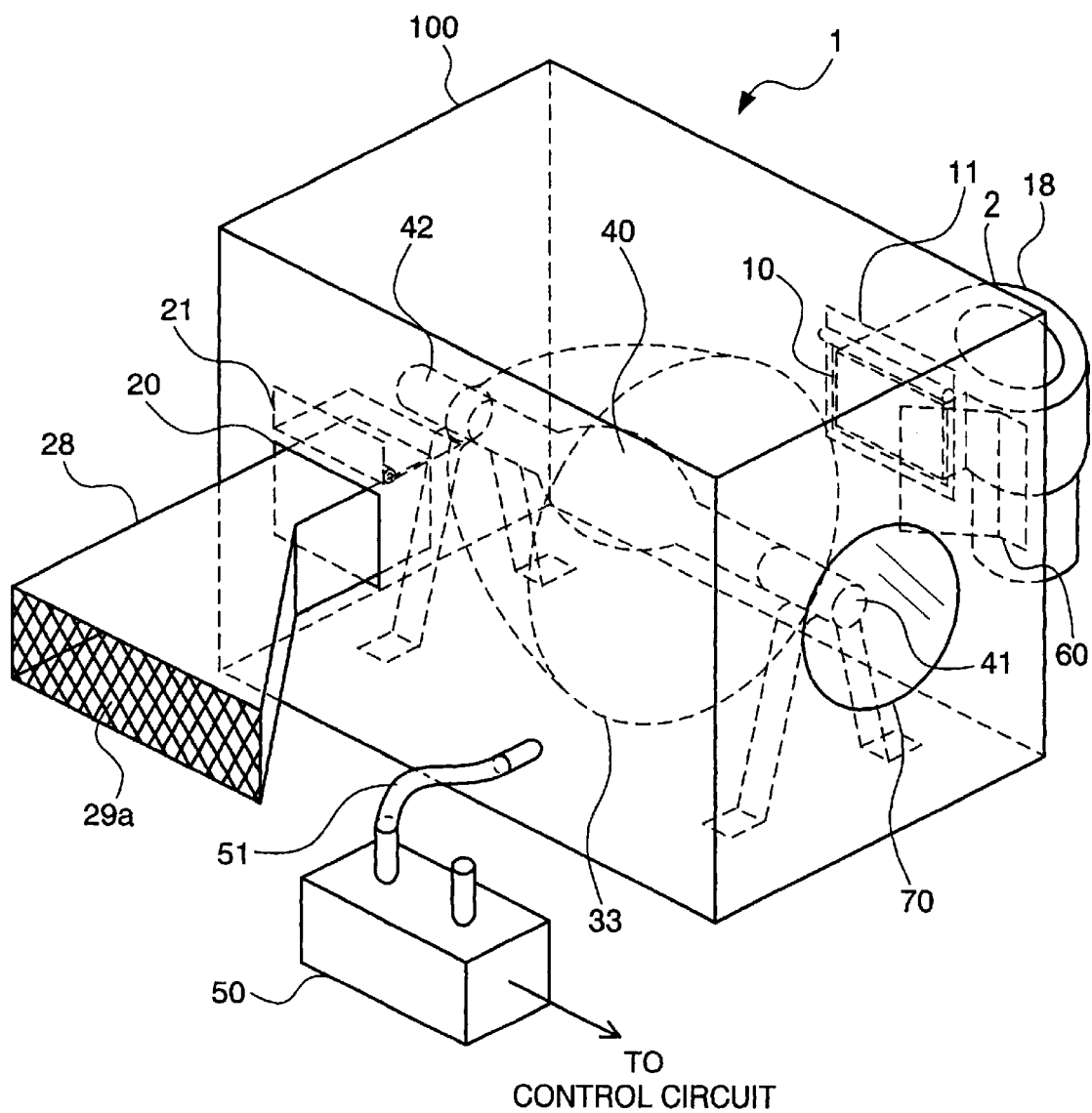
FIG. 3 is a perspective view showing the structure of the lamp house according to the first embodiment of the present invention as attached to a projector device.

FIG. 1 is a perspective view showing a structure of a lamp house 1 according to a first embodiment of the present invention, FIG. 2 is a perspective view showing a structure of the inside of the lamp house 1 according to the present embodiment, and FIG. 3 is a perspective view showing the structure of the lamp house 1 according to the present embodiment as attached to a projector device 2.

With reference to each of FIGS. 1, 2 and 3, the lamp house 1 of the present embodiment has, inside its housing 100, a lamp bulb 40 as a light source attached and a reflector 33 provided around the lamp bulb for reflecting and converging light, thereby converging light toward a window 70 to emit light to the outside of the lamp house 1.

Although in the present embodiment, the lamp bulb 40 is disposed horizontally in the lamp house 1 (as shown in the figures), the lamp house is not limited to the present system and the present invention can be embodied in the same manner by the lamp bulb 40 disposed vertically. Furthermore, although in the example shown in each figure, an anode cap part 42 of the lamp bulb 40 is attached facing the reflector 33 side and a cathode cap part 41 is attached facing the window 70 side, they may be attached facing either side.

With reference to FIGS. 1 and 3, the lamp house 1 according to the present embodiment is provided with an air inlet 10 and an air outlet 20 as cooling openings and inside the respective openings, movable plates 11 and 21 are arranged, respectively.

When the lamp house 1 is disposed at the projector device 2, the air inlet 10 is arranged at a position to which an outlet of a sirocco fan 18 of the projector device 2 attaches and the air outlet 20 is arranged at a position to which an exhaust port of a duct 28 of the projector device 2 attaches.

With this arrangement, the lamp house 1 receives outside air sent from the sirocco fan 18 of the projector device 2 through the air inlet 10 and directs the air concentratedly to the cap parts 41 and 42 of the lamp bulb 40 to cool the same and discharge air heated inside the lamp house 1d to the outside of the lamp house through the air outlet 20.

Figure 4:
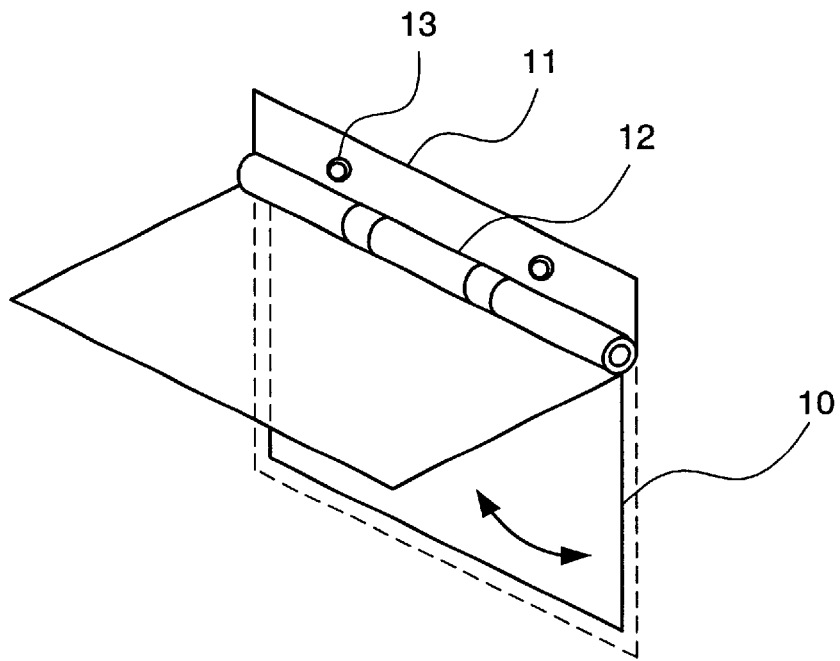
FIG. 4 is a perspective view showing a structure of a movable plate according to the first embodiment of the present invention.

FIG. 4 is a perspective view showing a structure of the movable plate 11 on the side of the air inlet 10 according to the present embodiment, which structure is the same as that of the movable plate 21 on the side of the air outlet 20.

As shown in FIG. 4, the movable plate 11 on the side of the air inlet 10 and the movable plate 21 on the side of the air outlet 20 are attached to the inner side of the side surface of the housing 100 of the lamp house 1 by a hinge 12. The movable plates 11 and 21 are structured to open only toward the inside of the housing 100 of the lamp house 1 and when no external force is applied to the movable plates 11 and 21 (i.e. the lamp house 1 is not disposed at the projector device 2), the movable plates 11 and 21 are closed because of their weight.

Therefore, when the lamp house 1 is detached from the projector device 2, all the openings (the air inlet 10 and the air outlet 20) of the lamp house 1 are closed. As a result of the movable plates 11 and 21 opening inwardly, if the internal lamp bulb 40 breaks for some reason, the openings remain closed to prevent broken pieces from scattering to the outside of the lamp house 1.

It is assumed here that although the lamp bulb 40 in the lamp house 1 is at a high pressure, the lamp house 1 has a strength enough for withstanding pressures beyond those which cause the lamp bulb 40 provided therein to break. Accordingly, the lamp house 1 will neither be deformed nor break thereby insulating the user from harm as a result of a breaking of the lamp bulb 40. This is because since the volume of the lamp bulb 40 is extremely smaller than that of the entire lamp house 1, the inside of the lamp house 1 will not attain a dangerously high pressure due to the lamp bulb 40 breakage. Further, the closing the lamp house 1 to prevent broken pieces from scattering to the outside of the lamp house minimizes the potential for harm. Complete closing is not always necessary; it is possible to provide a crevice or a hole so that gas of the breaking lamp bulb 40 may safely escape from the lamp house 1.

In addition, the movable plates 11 and 21 for closing the air inlet 10 and the air outlet 20, while the lamp bulb 40 emits light, open toward the inside of the lamp house 1 for ventilating and cooling as will be described in the following.

The movable plate 11 on the side of the air inlet 10, when the lamp bulb 40 emits light, receives a wind pressure of outside air sent from the sirocco fan 18 of the projector device 2 to automatically open toward the inside of the lamp house 1. As a result, the ventilation from the sirocco fan 18 enters the lamp house 1 through the air inlet 10 to cool the lamp bulb 40.

At the time of attaching the lamp house 1 to the projector device 2, the movable plate 21 on the side of the air outlet 20 is pushed up by the duct 28 of the projector device 2 inserted into the air outlet 20 from outside to open the air outlet 20 because of a structure of each of these devices. As a result, air heated by heat from the lamp bulb 40 can be discharged outside the lamp house 1 through the air outlet 20 by cooling.

In addition, for checking whether the lamp bulb 40 is currently being cooled receiving ventilation from the sirocco fan 18, a static pressure meter 50 for detecting a difference between an internal pressure and an external pressure of the lamp house 1 is provided. The inside of the lamp house 1 and the static pressure meter 50 are connected through a tube 51.

The static pressure meter 50 checks whether cooling is conducted by measuring a difference between an internal pressure and an external pressure of the lamp house 1 caused by the lamp bulb 40.

The static pressure meter 50 for checking cooling is connected to a control circuit or the like of the projector device 2. When no ventilation is conducted, the control circuit executes a processing such as starting ventilation, stopping light emission (stopping power supply to the lamp bulb 40), and/or notifying to a user to prevent overheating of the lamp bulb 40.

The duct 28 has its air outlet side covered with a metal mesh 29a (wire netting) to prevent broken pieces generated when the lamp bulb 40 breaks up from scattering to the outside of the projector device 2.

The duct 28 has an opening which is wider than the inlet of the projector device 2 which engages the outlet 20 of the housing 1. The outlet of the duct 28 has metal mesh 29a is attached thereto. Attaching the metal mesh 29a to the wider air outlet side allows an area through which air can pass within the duct 28 to be wider thereby improving cooling efficiency.

Reducing the area of each opening increases the wind speed per volume of output of the ventilation device (sirocco fan 18) in front of each opening. Further, providing each opening in front of the cap parts 41 and 42 (i.e., the parts of the lamp bulb 40 which need to be especially intensively cooled) enhances efficient cooling.

Moreover, inside the lamp house 1, a guide metallic part 60 is provided to direct ventilation from the sirocco fan 18 taken in through the air inlet 10; the direction of the ventilation can be targeted on the cap part of the lamp bulb 40 to locally and intensively cool the same.

With the guide metallic part 60 shown in FIGS. 1, 2 and 3, ventilation from the sirocco fan 18 may be divided into two, one turning to cool the anode cap part 42 and the other going straight, without turning, to cool the cathode cap part 41, thereby simultaneously cooling both the cap parts.

Next, a second embodiment of the present invention will be described in detail with reference to the drawings.

There will be a case where the projector device 2 is attached to a ceiling upside-down as an installation state and the lamp house 1 might as a single body be turned upside down or laid sideways. In such a case, in the lamp house 1 of the first embodiment, since the movable plates 11 and 21 are closed only because of their own weight, they may open in the above states and there is danger of scattering of broken pieces to the outside of the lamp house which are generated by breakup of the lamp bulb 40. In the present embodiment, by pressing movable plates 11a and 21a by a spring 14, the movable plates 11a and 21a are made not to open even in such a case to realize safety during the work of attaching the lamp house to the projector device 2 and other time. Also when the lamp bulb 40 emits light, open each of the movable plates 11a and 21a with ease to cool the lamp bulb 40 similarly to the first embodiment.

Figure 5:
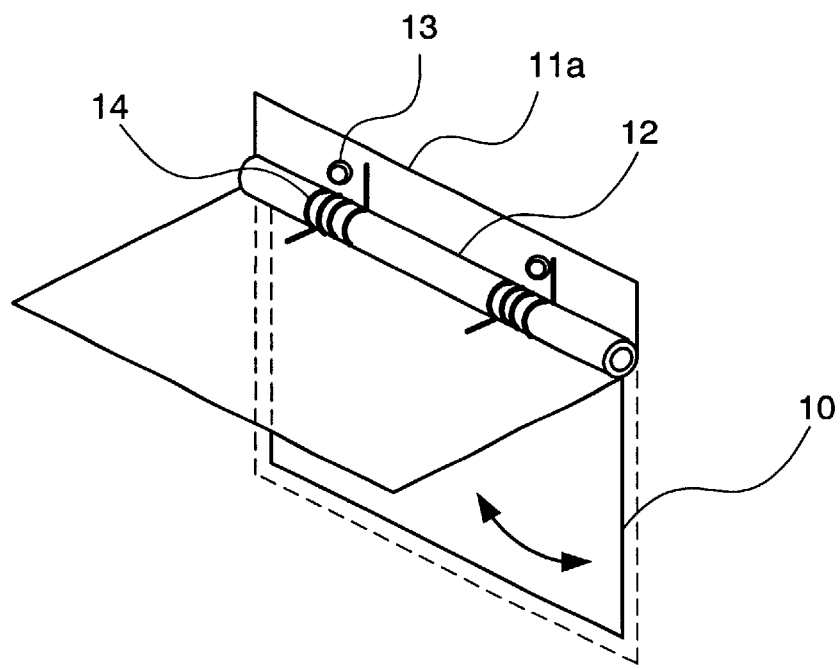
FIG. 5 is a perspective view showing a structure of a movable plate according to a second embodiment of the present invention.

FIG. 5 is a perspective view showing a structure of the movable plate 11a of a lamp house 1a according to the second embodiment of the present invention.

With reference to FIG. 5, the difference of the lamp house 1a of the present embodiment from its counterpart in the first embodiment is that the movable plates 11a and 21a disposed at the respective openings of the air inlet 10 and the air outlet 20 are provided with the spring 14 for maintaining the movable plates 11a and 21a in a closed state.

The spring 14 is assumed to have such a strength that the movable plates 11a and 21a will not open due to their own weight but will open with ease by wind pressure of the sirocco fan 18. As the movable plates 11a and 21a are small in area and light in weight whereas the sirocco fan 18 generates a high wind pressure, the above-described opening and closing operation can be realized by appropriately setting the strength of the spring 14.

In addition to the effects attained by the first embodiment, since the foregoing described present embodiment is structured to have the spring 14 press the movable plates 11a and 21a provided at the openings of the lamp house 1, when the lamp house is not attached to the projector device 2, the movable plates 11a and 21a are allowed to remain closed irrespective of an installation direction and installation situations, thereby achieving safety while maintaining easiness of attachment of the lamp house 1a to the projector device 2.

Next, a third embodiment of the present invention will be described in detail with reference to the drawings.

In the present embodiment, determining whether the lamp bulb 40 is being cooled is made by detecting opening and closing states of a movable plate 11b disposed at the air inlet 10 without requiring the static pressure meter 50.

Figure 6:
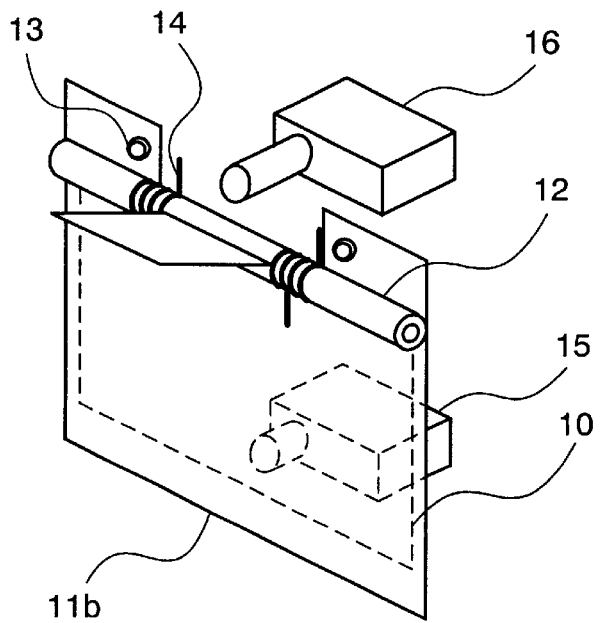
FIG. 6 is a perspective view showing a state of a movable plate closed according to a third embodiment of the present invention.
Figure 7:
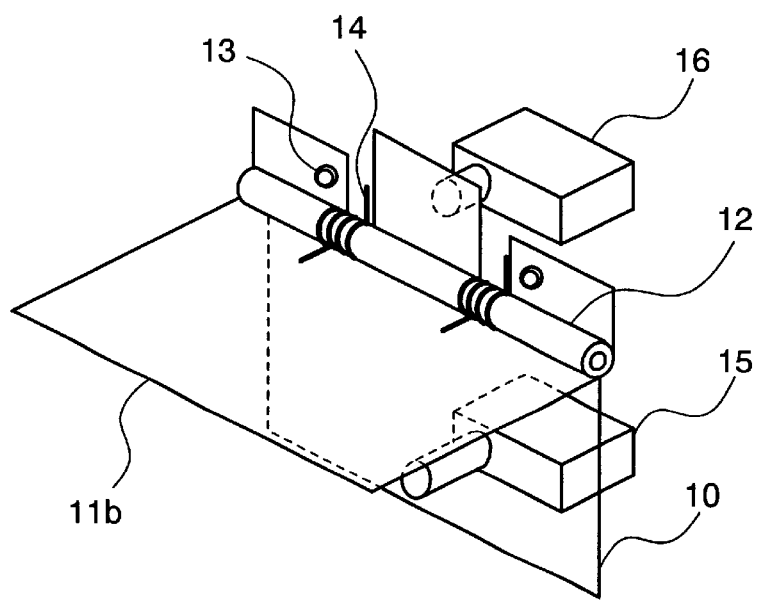
FIG. 7 is a perspective view showing a state of the movable plate opened according to the third embodiment of the present invention.

FIG. 6 is a perspective view showing a state of the movable plate 11b closed according to the present embodiment, while FIG. 7 is a perspective view showing a state of the movable plate 11b open according to the present embodiment.

With reference to each of FIGS. 6 and 7, the difference of a lamp house 1b of the present embodiment from its counterpart in the second embodiment is that a switch for determining whether the movable plate 11b disposed at the air inlet 10 is open or closed is provided and in the example shown in each of the figures, two switches, a first switch 15 and a second switch 16 are provided.

Each of the switches 15 and 16, similar to the static pressure meter 50 of the first and second embodiments, is connected to a control circuit of a projector device 2 to inform the control circuit as to whether the lamp bulb 40 is being cooled.

The movable plate 11b is L-shaped with the hinge 12 provided in-between as shown in each figure. The first switch 15 is turned "OFF" when the movable plate 11b is open slightly and the second switch 16 is turned "ON" when the same is open further.

In FIG. 6, the movable plate 11b is closed without receiving ventilation from the sirocco fan 18, so that the first switch 15 disposed at the position of the opening of the air inlet 10 is turned "ON" and the second switch 16 disposed on the opposite side of the hinge 12 with respect to the air inlet 10 is turned "OFF". In this case, the control circuit determines that the lamp bulb 40 is not being cooled to execute predetermined operation which is to be conducted in such a case in a manner as described in the first embodiment.

In FIG. 7, the movable plate 11b receives ventilation from the sirocco fan 18 and is opened due to the wind pressure. In this case, the first switch 15 is turned "OFF" and the second switch 16 is turned "ON". As a result, the control circuit determines that the lamp bulb 40 is being cooled and, therefore, it is safe to continuing emitting light with the lamp bulb 40 (i.e., the control circuit does not need to change the current state).

Here, for determining whether ventilation exists or not, both of the first switch 15 and the second switch 16 are not always necessary and either one of the switches may be enough, unless they are specially required.

The switch can be disposed not exclusively on the side of the lamp house 1b and it can be disposed on the side of the projector device 2.

In addition, as long as the switch is capable of detecting opening and closing states of the movable plate 11b, any switch can be used such as a switch for detecting an angle at which the hinge 12 opens.

As described in the foregoing, the present embodiment does not need to use an expensive static pressure meter for determining whether the lamp bulb 40 is being cooled, and enables such determination with ease by detecting the movable plate 11b at the air inlet 10 being opened.

Next, a fourth embodiment of the present invention will be described in detail with reference to the drawings.

In the present embodiment, in place of the guide metallic part 60 of the first embodiment, by making use of the angle at which the movable plate 11b may be opened, the direction of outside air being sent through the air inlet 10 into a lamp house 1c may be directed toward the cap part of the lamp bulb 40 to be intensively cooled.

Figure 8:
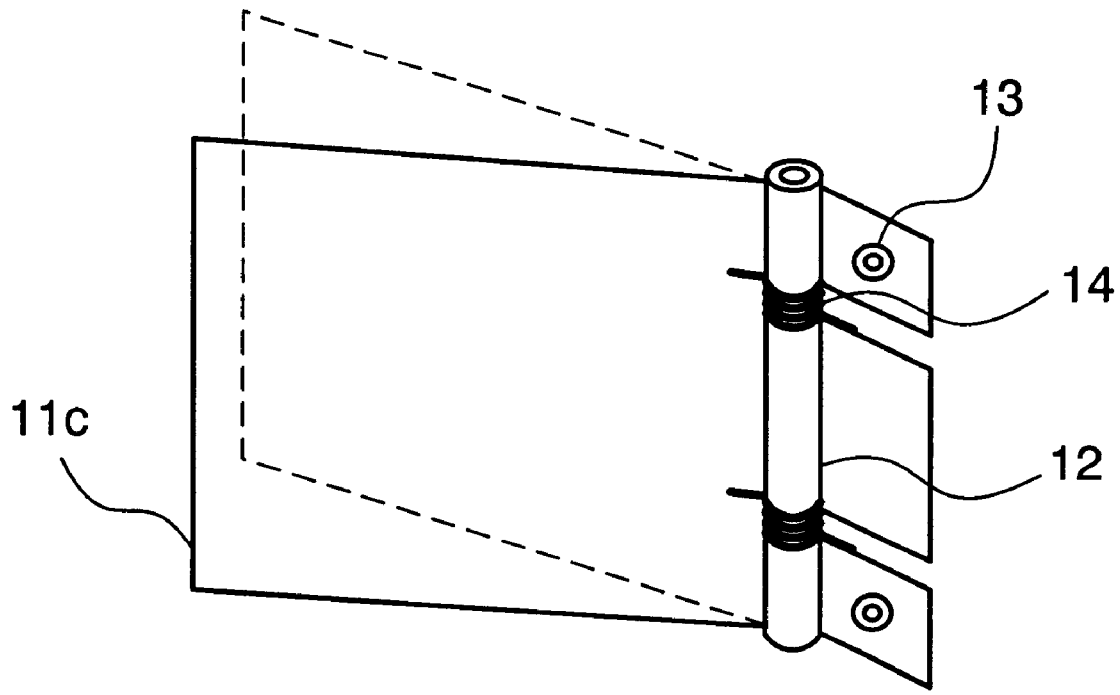
FIG. 8 is a perspective view showing a state of a movable plate opened according to a fourth embodiment of the present invention.

FIG. 8 is a perspective view showing a movable plate 11c being opened according to the fourth embodiment of the present invention.

With reference to FIG. 8, in the present embodiment, the movable plate 11c disposed at the air inlet 10 is designed to be L-shaped with the hinge 12 provided in-between so that the movable plate 11c opens at a fixed angle.

Figure 9:
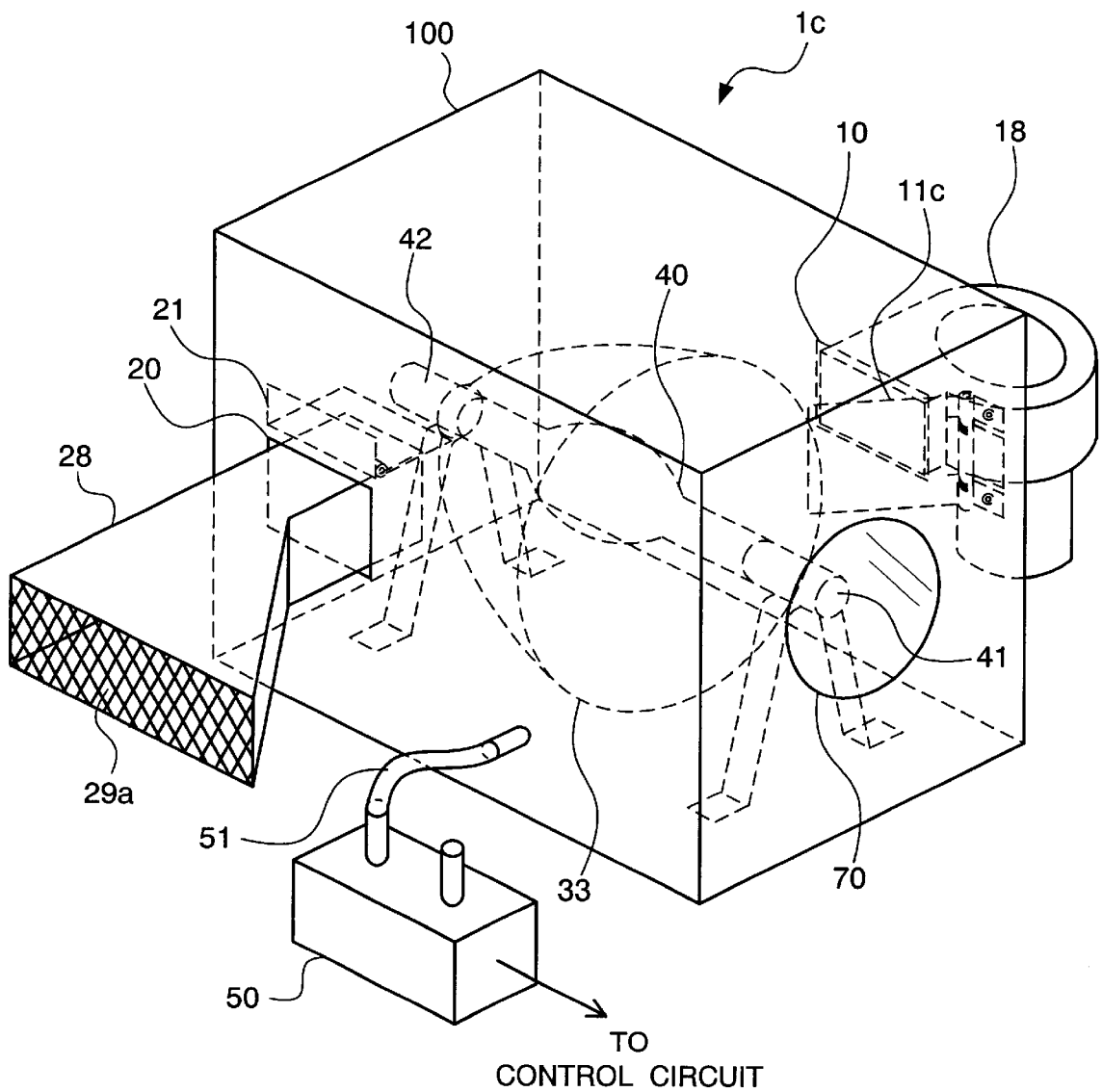
FIG. 9 is a perspective view showing a structure of a lamp house according to the fourth embodiment of the present invention as attached to a projector device.
Figure 10:
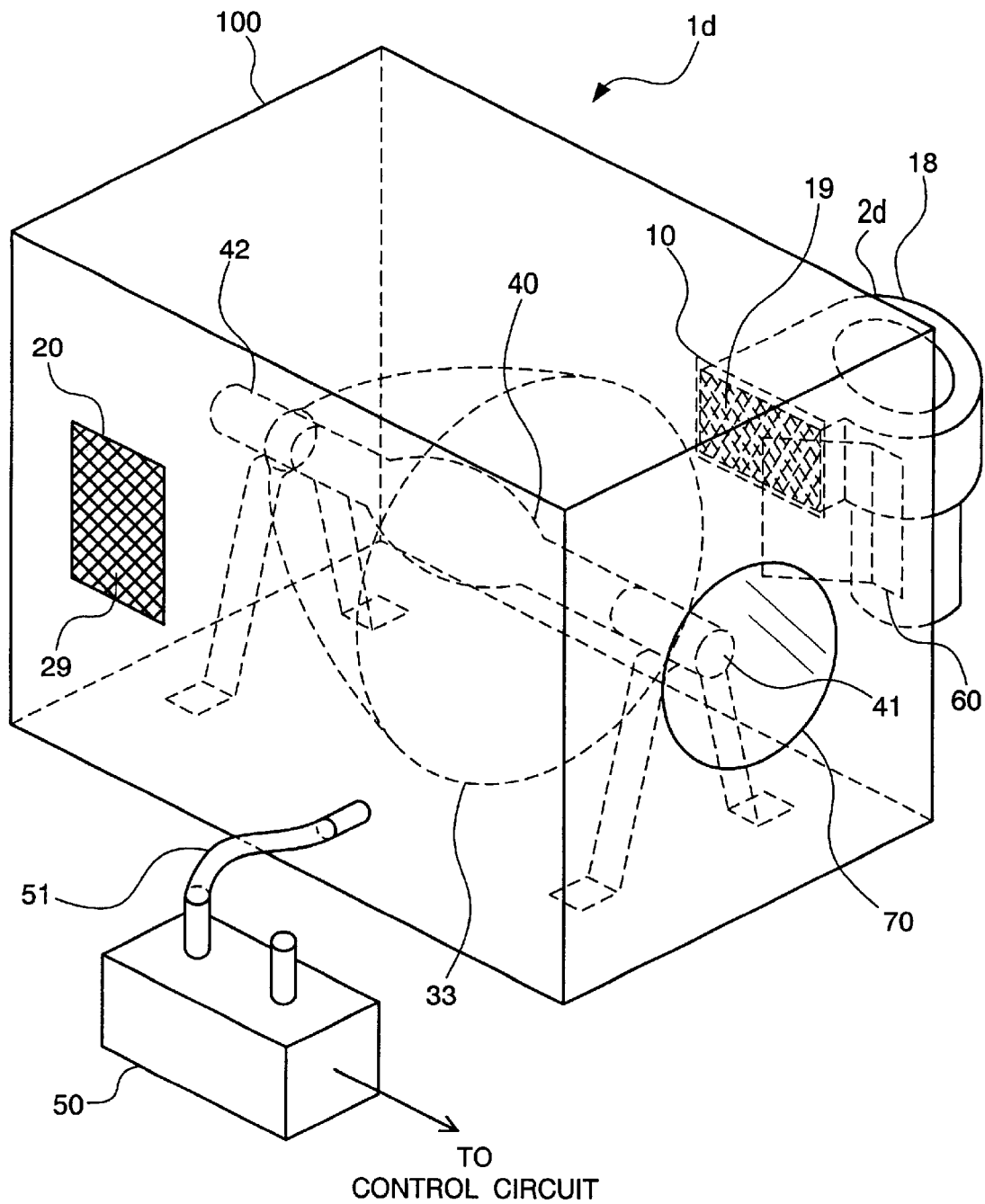
FIG. 10 is a perspective view showing a structure of a conventional lamp house as attached to a projector device.

FIG. 9 is a perspective view showing a structure of the lamp house 1c according to the fourth embodiment of the present invention as disposed at the projector device 2.

The movable plate 11c is bent to be L-shaped and as illustrated in FIG. 9, an angle of the plate being opened by wind pressure of the sirocco fan 18 can be set in advance. This arrangement enables the movable plate 11c, in place of the guide metallic part 60 in each of the above-described embodiments, to serve as a guide to lead cooling air to the cap part of the lamp bulb 40.

As described in the foregoing, in the present embodiment, the movable plate 11c disposed at the air inlet 10 functions as a guide to direct cooling air to the cap part of the lamp bulb 40 to have an advantage that provision of a guide metallic part conventionally provided inside the device is unnecessary.

Figure 11:
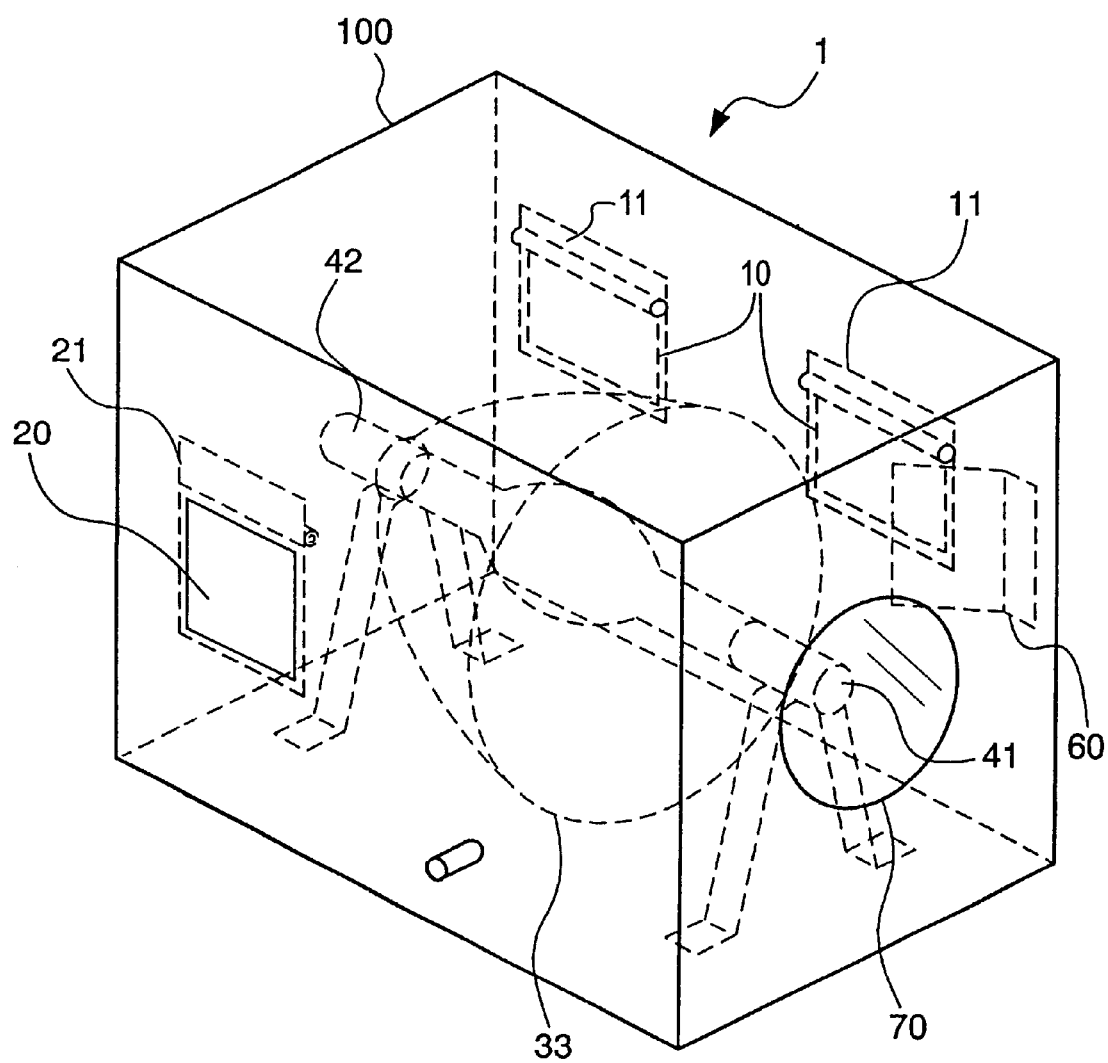
FIG. 11 is a perspective view showing a structure of a lamp house having a plurality of air inlets therein.

Although each of the above embodiments have been described with respect to an example where only one air inlet 10 is provided, a system in which the air inlet 10 and the air outlet 20 of the present invention are provided in the plural (as shown in FIG. 11) inside a lamp house can achieve the same effects of preventing danger of the lamp bulb 40 breakage. Such as system can also detect whether the bulb is being cooled and can appropriately direct ventilation into the lamp house to cool the cap parts 41 and 42 as those attained by the above described respective embodiments. For example, a system in which the air inlet 10 in particular is arranged near both of the cathode cap 41 and the anode cap 42 can realize local cooling of both the cap parts.

While each of the above embodiments has been described with respect to a lamp house in which the lamp bulb 40 is horizontally disposed as an example, the structure of the air inlet 10 and the air outlet 20 and the cooling system of the lamp bulb 40 as the characteristics of the present invention can be similarly realized in a lamp house in which the lamp bulb 40 is disposed vertically.

Similarly, while in each of the above-described embodiments, the anode cap 42 of the lamp bulb 40 is disposed on the side of the reflector 33 and the cathode cap 41 on the side of the window 70, the side on which these caps are arranged is not necessarily limited thereto. Irrespective of a side on which the anode cap 42 and the cathode cap 41 are disposed and a configuration and a direction of the reflector 33, the structure of the air inlet 10 and the air outlet 20 and the cooling system of the lamp bulb 40 as the characteristics of the present invention can be realized in the same manner.

As described in the foregoing, according to the lamp house and the projector device thereof of the present invention, the following effects can be attained.

First, when a lamp bulb breaks, the likelihood of scattering of all the broken pieces including minute pieces to the outside of a lamp house can be reduced to attain a high degree of safety. The reason is that because of the movable plates provided at the openings of the lamp house (i.e., the inlet and the outlet), when the lamp house is not attached to the projector device, the openings are closed.

Secondly, provision of the movable plate of the present invention eliminates the need of metal meshes in the lamp housing which are conventionally provided to prevent broken pieces generated when a lamp bulb breaks from going outside, thereby increasing a rate of opening to improve cooling efficiency.

In addition, since metal meshes for preventing broken pieces from going outside during cooling can be disposed outside the lamp house (on the side of the projector device), by attaching the metal meshes to the projector at a location having a large area, a large effective opening area can be ensured.

Thirdly, an expensive static pressure meter for measuring a difference between an internal pressure and an external pressure is unnecessary which is conventionally used in determining whether a lamp bulb is being cooled. The reason is that detecting opening and closing states of the movable plate of the present invention enables detection whether the lamp bulb is being cooled.

Fourthly, the provision of a spring which closes the movable plate allows, when the lamp house is not attached to the projector device, the movable plate to remain closed irrespective of the direction of the lamp bulb, thereby reducing danger of scattering of broken pieces to the outside at the time of bulb breakage to realize a high degree of safety. The reason is that since some load is required to open the movable plate disposed at the lamp house opening, the movable plate will not be opened easily depending on installation situations and the like.

Fifthly, a guide plate conventionally provided for locally cooling a lamp bulb is not necessary. The reason is that the movable plate disposed at an air inlet may be used to control the flow and direction of cooling air.

Although the invention has been illustrated and described with respect to exemplary embodiments thereof, it should be understood by those skilled in the art that the foregoing and various other changes, omissions and additions may be made therein and thereto, without departing from the spirit and scope of the present invention. Therefore, the present invention should not be understood as limited to the specific embodiments set out above but to include all possible embodiments which can be embodied within a scope encompassed and equivalents thereof with respect to the features set out in the appended claims.

What is claimed is:

1. A lamp house comprising:
   an inlet vent for cooling a light source provided in a housing by ventilation;
   a first movable plate which is adapted to open only toward the inside of said housing and which is adapted to cover said inlet vent;
   an outlet vent for cooling the light source;
   a second movable plate which is adapted to open only toward the inside of said housing and which is adapted to cover said outlet vent; and
   a first spring for biasing said first movable plate toward a closed position.

2. The lamp house as set forth in claim 1, wherein each of said first and second movable plates is attached to the inner side of the side surface of said housing by means of a hinge provided at the upper part of said first and second movable plates, and wherein when said lamp house is not attached to a projector device, said first and second movable plates close because of their own weight.

3. The lamp house as set forth in claim 1, wherein when said lamp house is attached to a projector device, said first movable plate opens inwardly upon receiving ventilation from said projector device and said second movable plate opens upon insertion of a duct of said projector device into said housing through said outlet vent.

4. The lamp house as set forth in claim 2, wherein when said lamp house is attached to the projector device, said first movable plate opens inwardly upon receiving ventilation from said projector device and said second movable plate opens upon insertion of a duct of said projector device into said housing through said outlet vent.

5. The lamp house as set forth in claim 3, wherein when said lamp house is not attached to the projector device, said first spring closes said movable plate irrespective of the position of said housing, and wherein said first movable plate is adapted to open inwardly upon receiving ventilation from said projector device.

6. The lamp house as set forth in claim 4, wherein when said lamp house is not attached to the projector device, said first spring closes said movable plate irrespective of the position of said housing, and wherein said first movable plate is adapted to open inwardly upon receiving ventilation from said projector device.

7. The lamp house as set forth in claim 3, further comprising:
a sensor for detecting opening and closing states of said first movable plate.

8. The lamp house as set forth in claim 4, further comprising:
a sensor for detecting opening and closing states of said first movable plate.

9. The lamp house as set forth in claim 5, further comprising:
a sensor for detecting opening and closing states of said first movable plate.

10. The lamp house as set forth in claim 6, further comprising:
a sensor for detecting opening and closing states of said first movable plate.

11. The lamp house as set forth in claim 1, wherein when using said lamp house in conjunction with a projector device, an air path is defined between said first and second moveable plates.

12. The lamp house as set forth in claim 11, wherein each of said first and second movable plates is attached to the inner side of the side surface of said housing by means of a hinge provided at the upper part of said first and second movable plates, and wherein when said lamp house is not attached to a projector device, said first and second movable plates close because of their own weight.

13. The lamp house as set forth in claim 11, wherein when said lamp house is attached to a projector device, said first movable plate opens inwardly upon receiving ventilation from said projector device, and said second movable plate opens upon insertion of a duct of said projector device into said housing through said outlet vent, and wherein when said lamp house is not attached to the projector device, said first spring closes said movable plate irrespective of the position of said housing, and wherein said first movable plate is adapted to open inwardly upon receiving ventilation from said projector device.

14. A lamp house comprising:
an inlet vent for cooling a light source provided in a housing by ventilation;
a first movable plate which is adapted to open only toward the inside of said housing and which is adapted to cover said inlet vent;
an outlet vent for cooling the light source;
a second movable plate which is adapted to open only toward the inside of said housing and which is adapted to cover said outlet vent; and
a first spring for biasing said first movable plate toward a closed position,
wherein said inlet vent includes a plurality of air inlets.

15. A projector device to which a lamp house is attached, said lamp house comprising:
an inlet vent for cooling a light source provided in a housing by ventilation;
a first movable plate which is adapted to open only toward the inside of said housing and which is adapted to cover said inlet vent;
an outlet vent for cooling the light source;
a second movable plate which is adapted to open only toward the inside of said housing and which is adapted to cover said outlet vent; and
a first spring for biasing said first movable plate toward a closed position.

16. The projector device as set forth in claim 15, said device further comprising:
a duct for externally discharging exhaust air from said lamp house, wherein at the time of attachment of said lamp house to said projector device, said duct is inserted into said housing through said outlet vent to open said second movable plate.

17. A projector device to which a lamp house is attached, said lamp house comprising:
an inlet vent for cooling a light source provided in a housing by ventilation;
a first movable plate which is adapted to open only toward the inside of said housing and which is adapted to cover said inlet vent;
an outlet vent for cooling the light source;
a second movable plate which is adapted to open only toward the inside of said housing and which is adapted to cover said outlet vent; and
a first spring for biasing said first movable plate toward a closed position,
wherein said device further comprises:
a duct for externally discharging exhaust air from said lamp house,
wherein at the time of attachment of said lamp house to said projector device, said duct is inserted into said housing through said outlet vent to open said second movable plate and wherein said duct has an exhaust air outlet for discharging exhaust air from said lamp house, wherein said exhaust air outlet has an area which is larger than a sectional area of each part of said duct, and wherein said exhaust air outlet is covered with wire netting.

18. The projector device as set forth in claim 15, the device further comprising:
ventilation means for ventilating said lamp house,
wherein said ventilation means opens said first movable plate toward the inside of said housing by a wind pressure caused at the time of ventilation.

19. The projector device as set forth in claim 16, the device further comprising:
ventilation means for ventilating said lamp house,
wherein said ventilation means opens said first movable plate toward the inside of said housing by a wind pressure caused at the time of ventilation.

20. The projector device as set forth in claim 17, the device further comprising:

ventilation means for ventilating said lamp house,
wherein said ventilation means opens said first movable plate toward the inside of said housing by a wind pressure caused at the time of ventilation.

21. The projector device as set forth in claim 18, the device further comprising:

control means for controlling operation of said lamp house, wherein said control means determines whether said light source is being cooled according to opening and closing states of said first movable plate.

22. The projector device as set forth in claim 19, the device further comprising:

control means for controlling operation of said lamp house, wherein said control means determines whether said light source is being cooled according to opening and closing states of said first movable plate.

23. The projector device as set forth in claim 20, the device further comprising:

control means for controlling operation of said lamp house, wherein said control means determines whether said light source is being cooled according to opening and closing states of said first movable plate.

24. The projector device as set forth in claim 21, the device further comprising:

a sensor for detecting opening and closing states of said first movable plate.

25. The projector device as set forth in claim 22, the device further comprising:

a sensor for detecting opening and closing states of said first movable plate.

26. The projector device as set forth in claim 23, the device further comprising:

a sensor for detecting opening and closing states of said first movable plate.

* * * * *